United States Patent
Gretz

(10) Patent No.: US 7,064,271 B1
(45) Date of Patent: Jun. 20, 2006

(54) RECESSED OUTLET BOX WITH BREAKAWAY COVER

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/246,985

(22) Filed: Oct. 7, 2005

Related U.S. Application Data

(63) Continuation-in-part of application No. 11/185,256, filed on Jul. 20, 2005, which is a continuation-in-part of application No. 11/102,392, filed on Apr. 8, 2005, which is a continuation-in-part of application No. 11/070,344, filed on Mar. 2, 2005, now Pat. No. 6,965,078, which is a continuation-in-part of application No. 11/009,116, filed on Dec. 10, 2004, which is a continuation-in-part of application No. 10/863,942, filed on Jun. 9, 2004, now Pat. No. 6,956,171.

(51) Int. Cl.
*H01H 9/02* (2006.01)

(52) U.S. Cl. .............................. 174/58; 174/53; 174/57; 174/61; 220/3.2; 220/3.3; 248/906

(58) Field of Classification Search ................. 174/48, 174/49, 50, 53, 57, 58, 52.1, 59, 61, 63, 66, 174/67; 220/3.2, 3.3, 3.4, 3.5, 3.6, 3.7, 3.8, 220/3.9, 4.02; 439/535, 536, 537, 538; 248/906; D13/152, 177
See application file for complete search history.

(56) References Cited

U.S. PATENT DOCUMENTS

| | | | | |
|---|---|---|---|---|
| 4,988,832 A | * | 1/1991 | Shotey | 174/67 |
| 5,228,584 A | * | 7/1993 | Williams, Jr. | 220/3.8 |
| 5,317,108 A | | 5/1994 | Prairie, Jr. | |
| 5,342,993 A | * | 8/1994 | Siems | 174/48 |
| 5,362,924 A | * | 11/1994 | Correnti | 174/67 |
| 5,387,761 A | | 2/1995 | Simonis | |
| 5,527,993 A | * | 6/1996 | Shotey et al. | 174/67 |
| 5,731,544 A | * | 3/1998 | Burck et al. | 174/66 |
| 6,570,091 B1 | * | 5/2003 | Kesler et al. | 174/67 |
| 6,722,621 B1 | | 4/2004 | Johnson | |
| 6,840,785 B1 | | 1/2005 | Drane | |
| 6,891,104 B1 | | 5/2005 | Dinh | |

* cited by examiner

*Primary Examiner*—Angel R. Estrada

(57) ABSTRACT

A recessed electrical box with a breakaway cover. The cover member is rotatably attached to the electrical box and will slip off the box, without any damage to the electrical box or the cover member, if an excessive force is applied to the cover member while it is in the open position. Use of the recessed electrical box positions an electrical device substantially behind the surface of any structure. One or more flanges may be included on the exterior of the electrical box to enable easy positioning with respect to the structure's exterior surface. The flanges may be removable to facilitate installation in a retrofit situation on a finished building.

9 Claims, 18 Drawing Sheets

RECESSED OUTLET BOX WITH BREAKAWAY COVER

This application is a Continuation-In-Part of U.S. patent application Ser. No. 11/185,256, filed Jul. 20, 2005 and still pending, which is a Continuation-In-Part of U.S. patent application Ser. No. 11/102,392, filed Apr. 8, 2005 and still pending, which is a Continuation-In-Part of U.S. patent application Ser. No. 11/070,344, filed Mar. 2, 2005 and now U.S. Pat. No. 6,965,078, which is a Continuation-In-Part of U.S. patent application Ser. No. 11/009,116 filed Dec. 10, 2004 and still pending, which is a Continuation-In-Part of U.S. patent application Ser. No. 10/863,942 filed Jun. 9, 2004 and now U.S. Pat. No. 6,956,171.

FIELD OF THE INVENTION

1) This invention relates to electrical boxes and specifically to a recessed outlet box for accommodating and protecting a duplex outlet or other electrical device therein and including a cover member that breaks away when excessive force is applied thereto.

BACKGROUND OF THE INVENTION

2) Recessed electrical boxes for retrofitting on finished walls or for use in new construction were disclosed in co-pending U.S. application Ser. Nos. 10/863,942, 11/009,116, 11/070,344, 11/102,392, and 11/185,256, commonly owned by the assignee of the present invention, the contents of which are referred to herein and incorporated herein in this specification in their entirety. The recessed electrical box disclosed in the co-pending applications comprised an electrical box having an inner enclosure for housing an electrical device and an outer enclosure for recessing the inner enclosure well within a wall. One or more flanges extended outwardly from the electrical box. For mounting to new construction, a first, breakaway inner flange was left intact and utilized as is for securing the box to the newly constructed building's substrate. Conversely, if mounted to an existing building in a retrofit situation, the inner flange was broken away to allow insertion of the box within an appropriately sized hole created for the box in the existing building. An outer flange was provided for masking the siding or other wall covering at the juncture of the electrical box with the surrounding siding. A cover member having a narrow peripheral side wall was provided for closing and rainproofing the electrical device therein. The co-pending applications disclosed the outer enclosure of the electrical box being a larger size than the inner enclosure to facilitate easy access to the inner enclosure and easy shedding of any residual rainfall that penetrated therein.

3) Although the co-pending applications provided an improved rainproof electrical box, the box member was susceptible to damage from excessive force applied to the cover member in an open position.

4) What is needed therefore is a recessed electrical box with a cover member that adequately provides protection against rain and the elements to the electrical devices held therein but also is capable of breaking away and not susceptible to damage when excessive force is applied thereto.

SUMMARY OF THE INVENTION

5) The invention is a recessed electrical box with a breakaway cover. The cover member is rotatably attached to the electrical box and will slip off the box, without any damage to the electrical box or the cover member, if any excessive force is applied to the cover member while it is in the open position. Use of the recessed electrical box positions an electrical device substantially behind the surface of any structure. One or more flanges may be included on the exterior of the electrical box to enable easy positioning with respect to the structure's exterior surface. The flanges may be removable to facilitate installation in a retrofit situation on a finished building.

OBJECTS AND ADVANTAGES

6) One advantage of the recessed electrical box of the present invention is that it simplifies the installation of electrical devices on all types of finished exteriors, including siding or stucco. The siding can be flat or lapped and be constructed of vinyl, aluminum, or wood.

7) Another advantage provided by the electrical box of the present invention is that it is adaptable to being installed on an unfinished wall or as a retrofit on an existing finished wall.

8) A further advantage is that the recessed electrical box provides a first enclosure that positions the electrical device within the exterior wall, thereby shielding the electrical device from impacts, and a second enclosure for shielding the electrical device from rain and other environmental elements.

9) Another advantage is that the recessed electrical box of the present invention provides a breakaway inner flange, which can be retained for mounting on unfinished walls or broken off in a retrofit situation.

10) A further advantage is that a wide front flange is provided for covering mistakes or to cover a poorly cut mounting hole for a retrofit application.

11) The current recessed electrical box further provides, when used to house a duplex outlet, an electrical box and a spacious protective enclosure for protecting the plug ends of electrical cords.

12) A further advantage is that the electrical box, and inner and outer flanges are molded integrally in one piece, thereby reducing production costs.

13) The electrical box furthermore includes integral bosses with threaded bores for accepting fasteners from an electrical device.

14) The electrical box of the present invention also includes a breakaway cover member, which enables the cover member to avoid damage if an excessive force is applied to it when it is in the open position.

15) The electrical box of the present invention provides an electrical junction box that is UL-listed to meet the requirements of the electrical code. It has the advantage of working on all siding types and can be installed before or after the siding is installed.

16) These and other objects and advantages of the present invention will be better understood by reading the following description along with reference to the drawings.

Table of Nomenclature

Figure 1:
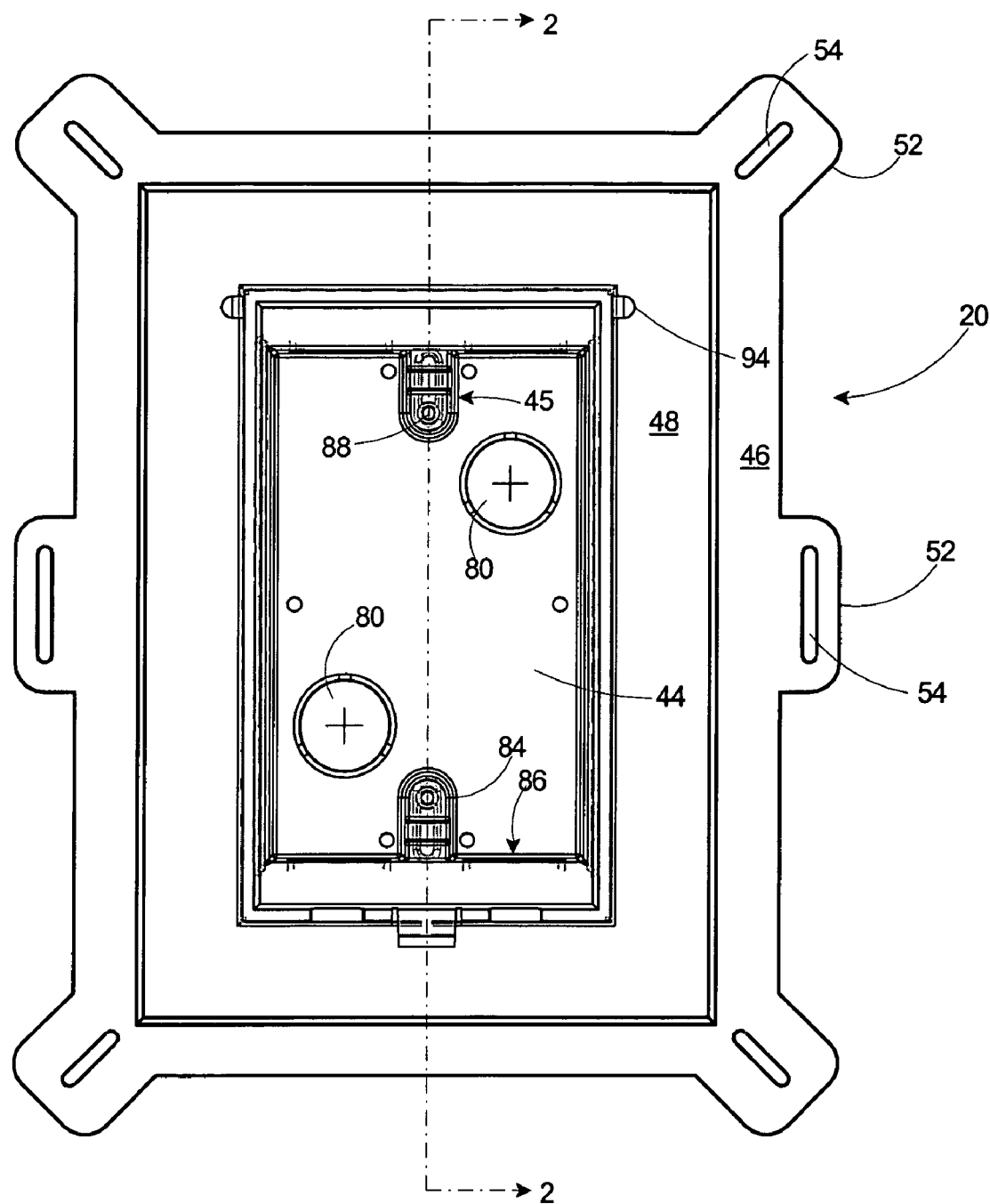
FIG. 1 is a front view of a first embodiment of a recessed electrical box according to the present invention.

41) The following is a listing of part numbers used in the drawings along with a brief description:

| Part Number | Description |
|---|---|
| 20 | recessed electrical box, first embodiment |
| 22 | first box |
| 24 | back wall of first box |
| 26 | peripheral sidewalls of first box |
| 28 | open front of first box |
| 30 | first enclosure |
| 32 | front edge of first box |
| 34 | transverse wall portion |
| 36 | second peripheral sidewalls or axial wall |
| 38 | second box |
| 40 | second enclosure |
| 42 | planar front edge of second box |
| 44 | opening of second box |

-continued

| Part Number | Description |
|---|---|
| 45 | securement arrangement |
| 46 | inner flange |
| 48 | outer flange |
| 50 | outer edge |
| 52 | ear |
| 54 | slot |
| 56 | back surface of inner flange |
| 58 | groove |
| 60 | first side of inner flange |
| 62 | second side of inner flange |
| 64 | third side of inner flange |
| 66 | fourth side of inner flange |
| 68 | outer periphery of second box |
| 70 | outer periphery of first box |
| 72 | plane of inner flange |
| 74 | plane of outer flange |
| 76 | indentation in outer flange |
| 78 | front surface of outer flange |
| 80 | removable wall portion |
| 81 | cord slots |
| 84 | integral projections |
| 86 | inner surface of peripheral sidewalls |
| 88 | threaded bore |
| 90 | cover member |
| 92 | apertures in cover member |
| 94 | post |
| 96 | gap |
| 100 | recessed electrical box, second embodiment |
| 102 | hole in substrate, siding, or both |
| 104 | siding |
| 106 | substrate |
| 110 | recessed electrical box, third embodiment |
| 112 | stucco finish layer |
| 114 | holes in inner flange |
| 118 | fastener |
| 120 | drilled hole in outer flange |
| 122 | back surface of outer flange |
| 124 | hole in outer flange |
| 126 | duplex outlet |
| 128 | device fasteners |
| 130 | face plate |
| 132 | terminal of duplex outlet |
| 134 | plug end |
| 136 | electrical cord |
| 140 | recessed electrical box, preferred embodiment |
| 142 | breakaway cover member |
| 143 | pin and socket arrangement |
| 144 | pin |
| 145 | peripheral side wall of cover member |
| 146 | sidewall |
| 148 | socket or aperture |
| 150 | ear |
| 152 | longitudinal or central axis through pins |
| 154 | base portion of pin |
| 156 | tip potion of pin |
| θ | angle of conical surface of pin |
| D | diameter of aperture in ear of cover member |
| L | width of pin at base |
| R | radius of tip portion of pin |
| W | length of pin |

DETAILED DESCRIPTION OF THE INVENTION

42) The present invention comprises a recessed electrical box for securing an electrical device on the exterior wall of a building. The recessed electrical box has features that allow it to be easily installed on either a new building or on an existing building. It can be installed on a new building having unfinished walls, in which the finishing surface, such as siding or stucco, will be installed later, or as a retrofit on an existing building.

43) With reference to FIGS. 1–4, a first embodiment of a recessed electrical box 20 according to the present invention is shown. The recessed electrical box includes a first box 22 having a back wall 24, orthogonally extending peripheral sidewalls 26, and an open front 28 defining a first enclosure 30 therein. The peripheral sidewalls 26 of the first box 22 include a front edge 32 at the open front 28. A transverse wall portion 34 extends outwardly and orthogonally from the peripheral sidewalls 26 at the front edge 32. Second peripheral sidewalls 36 extend orthogonally from the transverse wall portion 34 and form a second box 38 and a second enclosure 40 therein. The second peripheral sidewalls 36 terminate in a planar front edge 42. The planar front edge 42 includes an opening 44 therein leading into the second enclosure 40. A securement arrangement 45 at the open front 28 of the first enclosure 30 is capable of accepting an electrical device (not shown) therein.

Figure 2A:
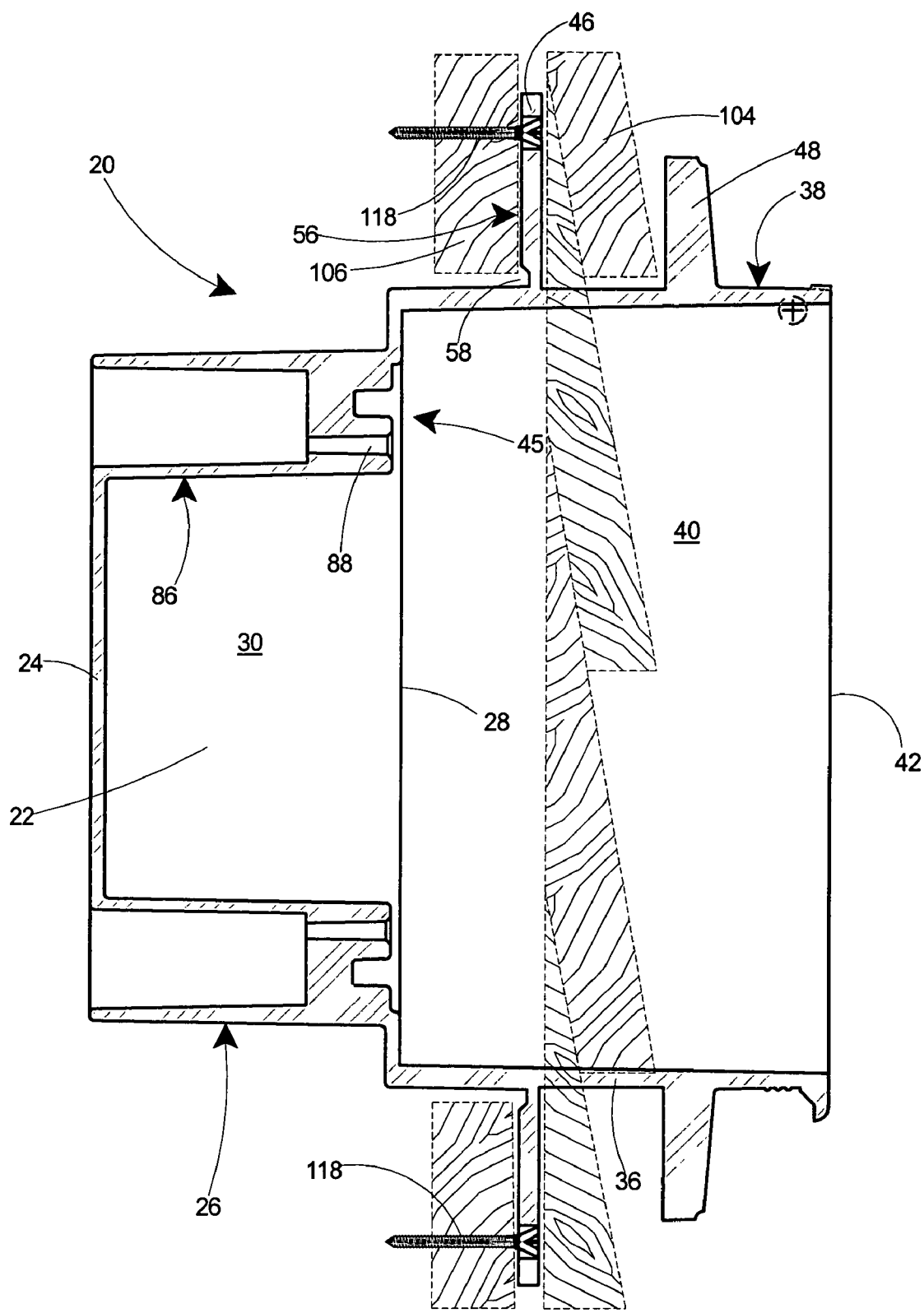
FIG. 2A is a sectional view of the recessed electrical box taken along line 2—2 of FIG. 1 and shown mounted to the substrate of a newly constructed building.
Figure 4:
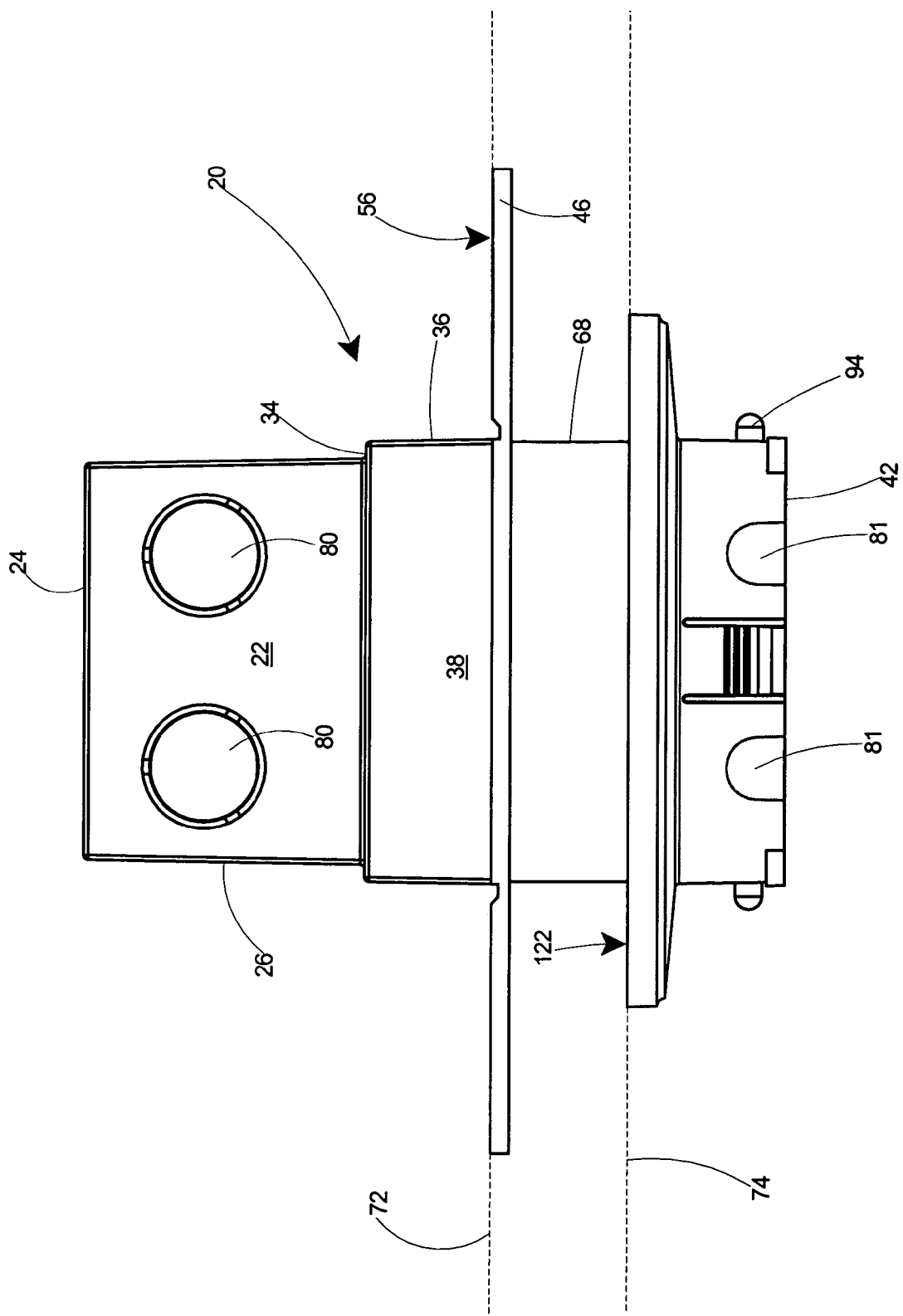
FIG. 4 is a bottom view of the electrical box of FIG. 1.
22)
Figure 5:
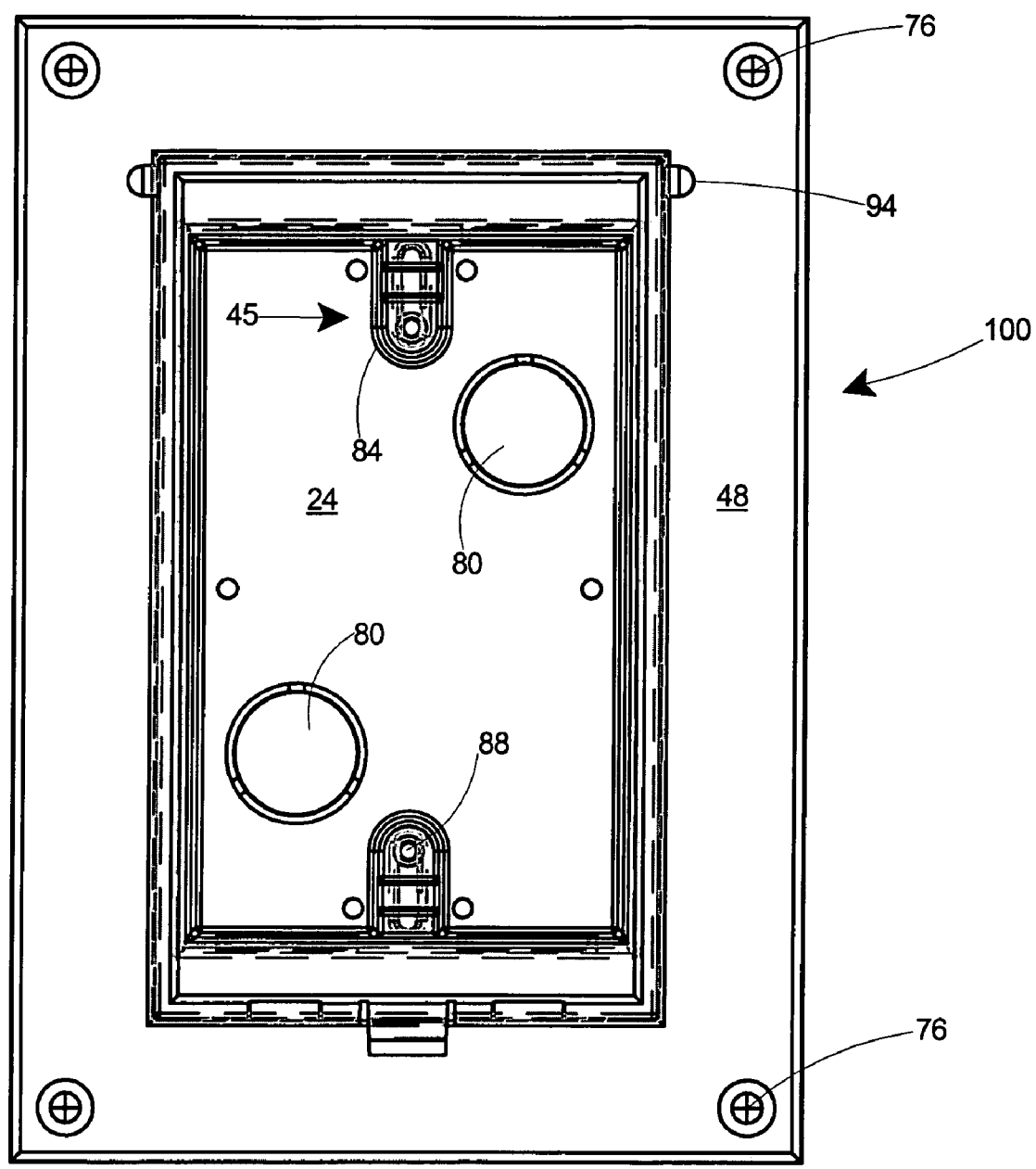
FIG. 5 is a front view of a second embodiment of a recessed electrical box according to the present invention.
23)

44) The recessed electrical box of the present invention includes at least one flange integral with and extending outwardly and orthogonally from the second peripheral sidewalls. For the first embodiment, as shown in FIGS. 2A and 4, the recessed electrical box 20 includes an inner flange 46 and an outer flange 48. As shown in FIGS. 1 and 4, the inner flange 46 extends transversely substantially beyond the outer flange 48. The outer flange 48 extends transversely substantially beyond the second peripheral sidewalls 36. The inner flange 46 includes an outer edge 50 and a plurality of ears 52 extending beyond the outer edge 50. A slot 54 is included in each of the ears 52 of the inner flange 46.

Figure 3:
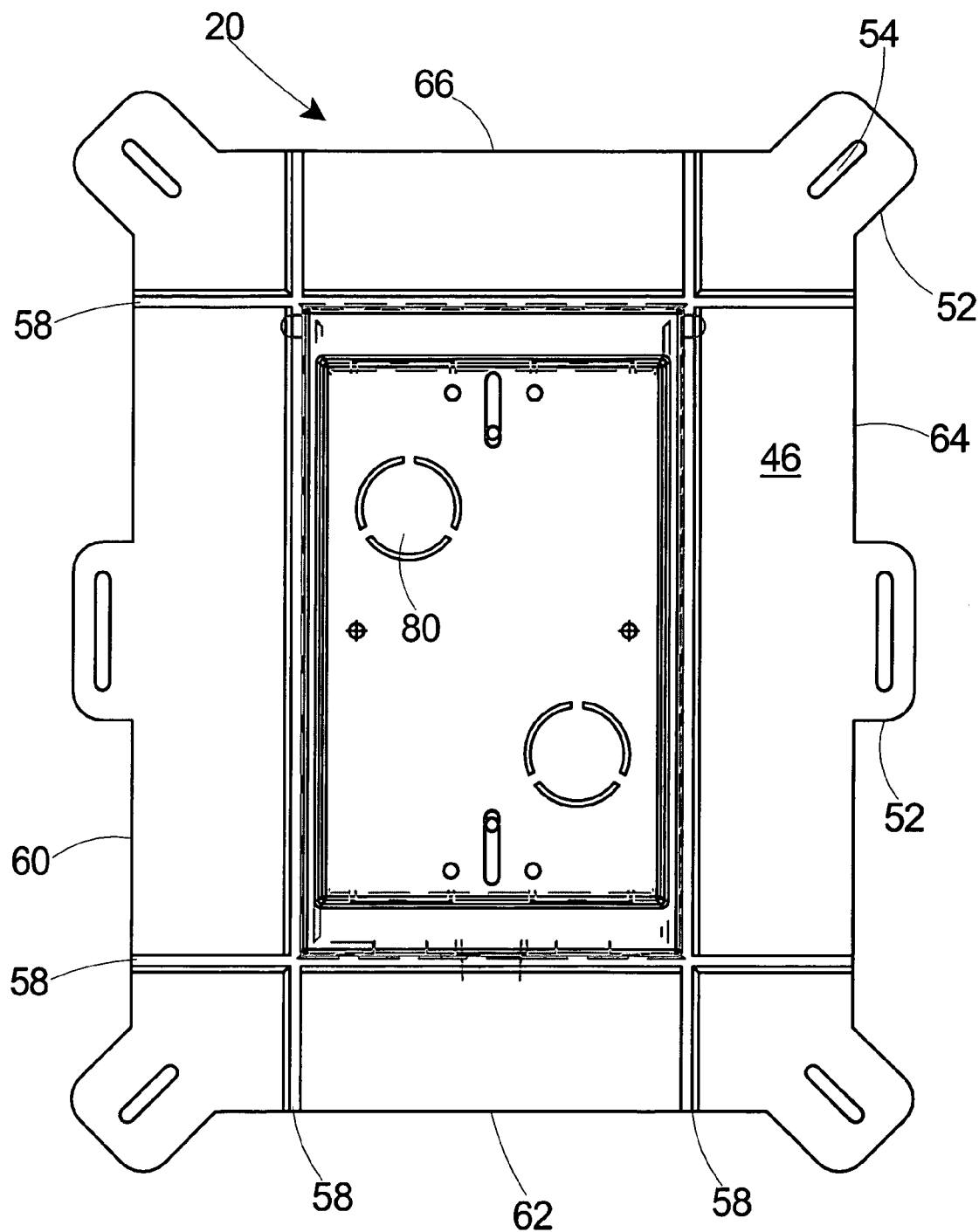
FIG. 3 is back view of the electrical box of FIG. 1.
21)

45) Referring to FIGS. 2A and 3, the back surface 56 of the inner flange 46 includes grooves 58 adjacent each of the second peripheral sidewalls 36. The grooves 58 extend from one side 60, 62 of the outer edge 50 to the corresponding opposing side 64, 66 of the outer edge 50. The grooves 58 form reduced thickness flange portions to allow scoring therein to remove the inner flange 46 adjacent the second peripheral sidewalls 36.

46) With reference to FIG. 4, the second box 38 has an outer periphery 68 that, as a result of the outwardly extending transverse wall portion 34, is larger than the outer periphery 70 of the first box 22. The inner 46 and outer 48 flanges are in parallel planes 72, 74. Removal of the inner flange 46 creates an outer surface substantially equal to the outer periphery 68 of the second box 38 or, in other words, scoring along the grooves 58 adjacent the outer periphery 68 and subsequently breaking off the inner flange 46 creates a smooth outer periphery with the inner flange 46 completely removed therefrom. The outer flange 48, as shown in FIG. 4, extends substantially beyond the second peripheral sidewalls 36.

47) Referring to FIGS. 1 and 4, the back wall 24 and the peripheral sidewalls 26 of the first box 22 include one or more removable wall portions 80 or knockouts, which may be removed to provide a passage for wiring into the first box 22. The second peripheral sidewalls 36 of the second box 38 also include one or more cord slots 81 extending therein from the front edge 42 at the opening 44. The cord slots 81 thereby forming a passageway for electrical cords.

48) With reference to FIGS. 1 and 2A, the recessed electrical box further includes a securement arrangement 45. The securement arrangement 45 includes integral projections 84 from the inner surface 86 of the peripheral sidewalls 26 that extend transversely into the first enclosure 30. The integral projections 84 include threaded bores 88 therein.

49) The recessed electrical box can further include a cover member, such as the cover member 90 having apertures 92 therein as shown in FIGS. 11–14. Typically the recessed electrical box 20 is provided with posts 94 at the planar front edge 42 of the second box 38, such as shown in FIG. 4, upon which the cover member (not shown) can be pivotably attached thereto to cover the outer opening 44 of the recessed electrical box 20. The inner 46 and outer 48 flanges of the recessed electrical box 20 reside in parallel planes 72, 74 and form a gap 96 therebetween. The width of the gap 96 is approximately 0.937 inch to allow it to accept siding of most standard thicknesses.

Figure 8:
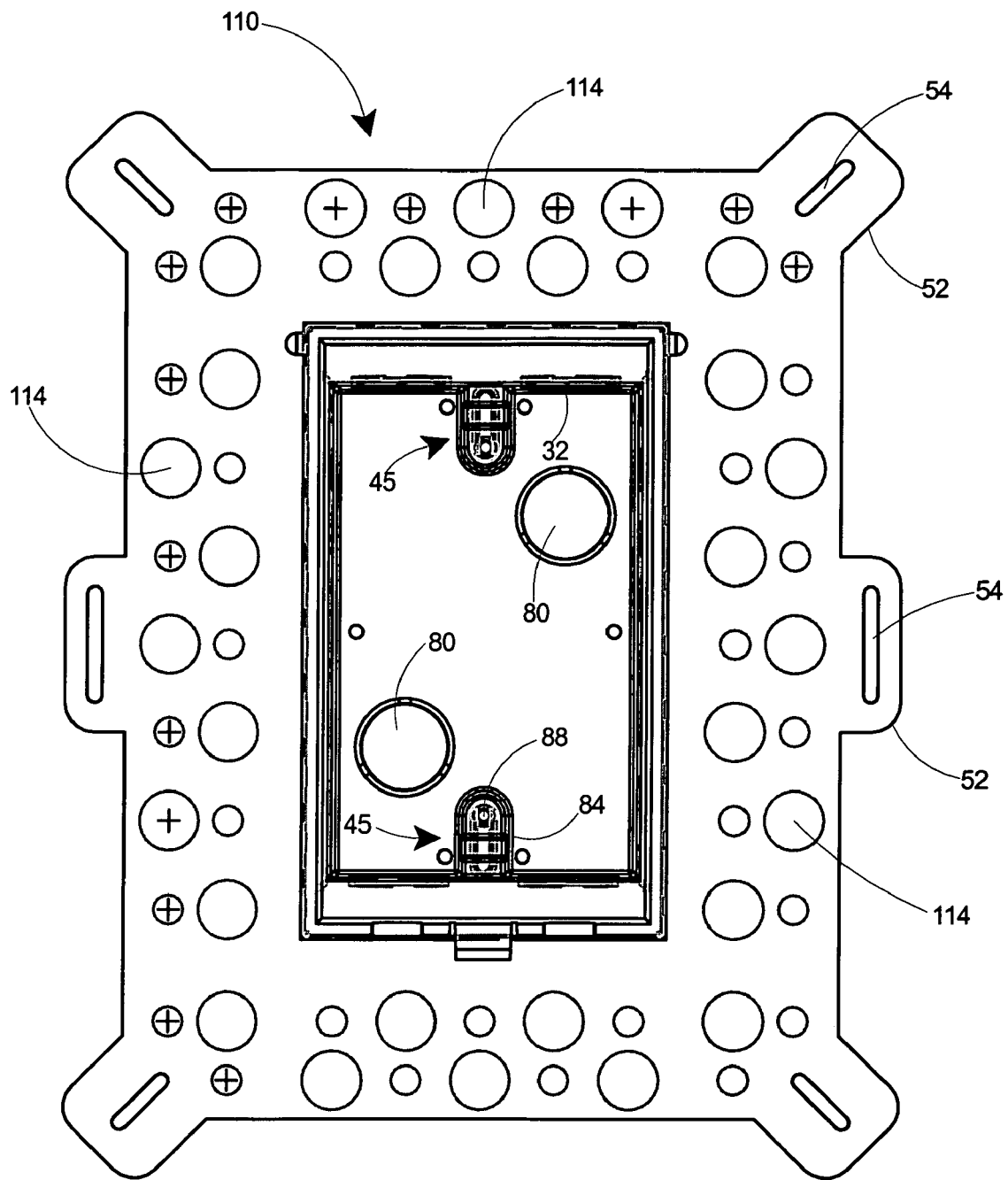
FIG. 8 is a front view of a third embodiment of a recessed electrical box according to the present invention.
26)
Figure 9:
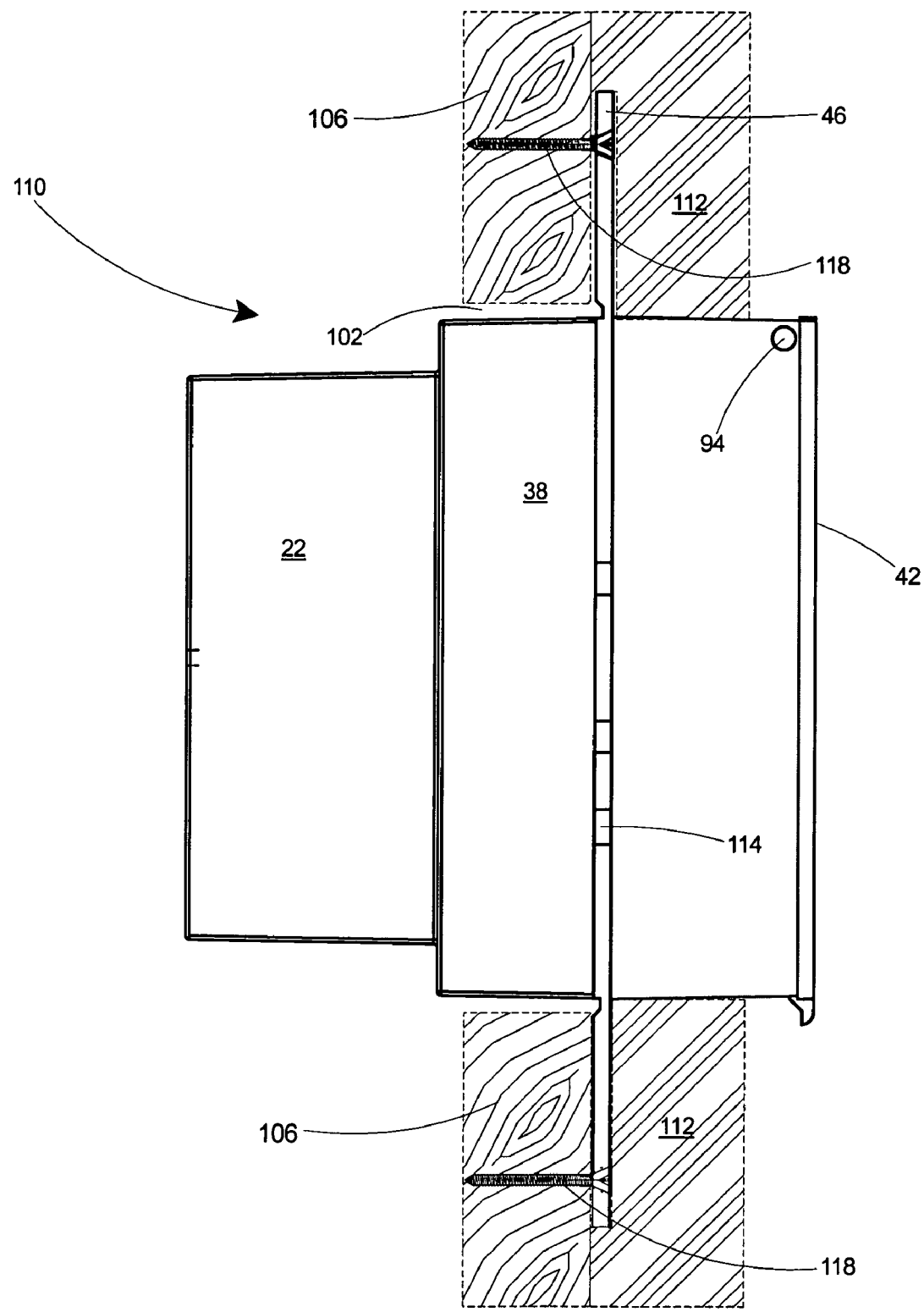
FIG. 9 is a side view of the recessed electrical box taken along line 9—9 of FIG. 8.
27)
Figure 10:
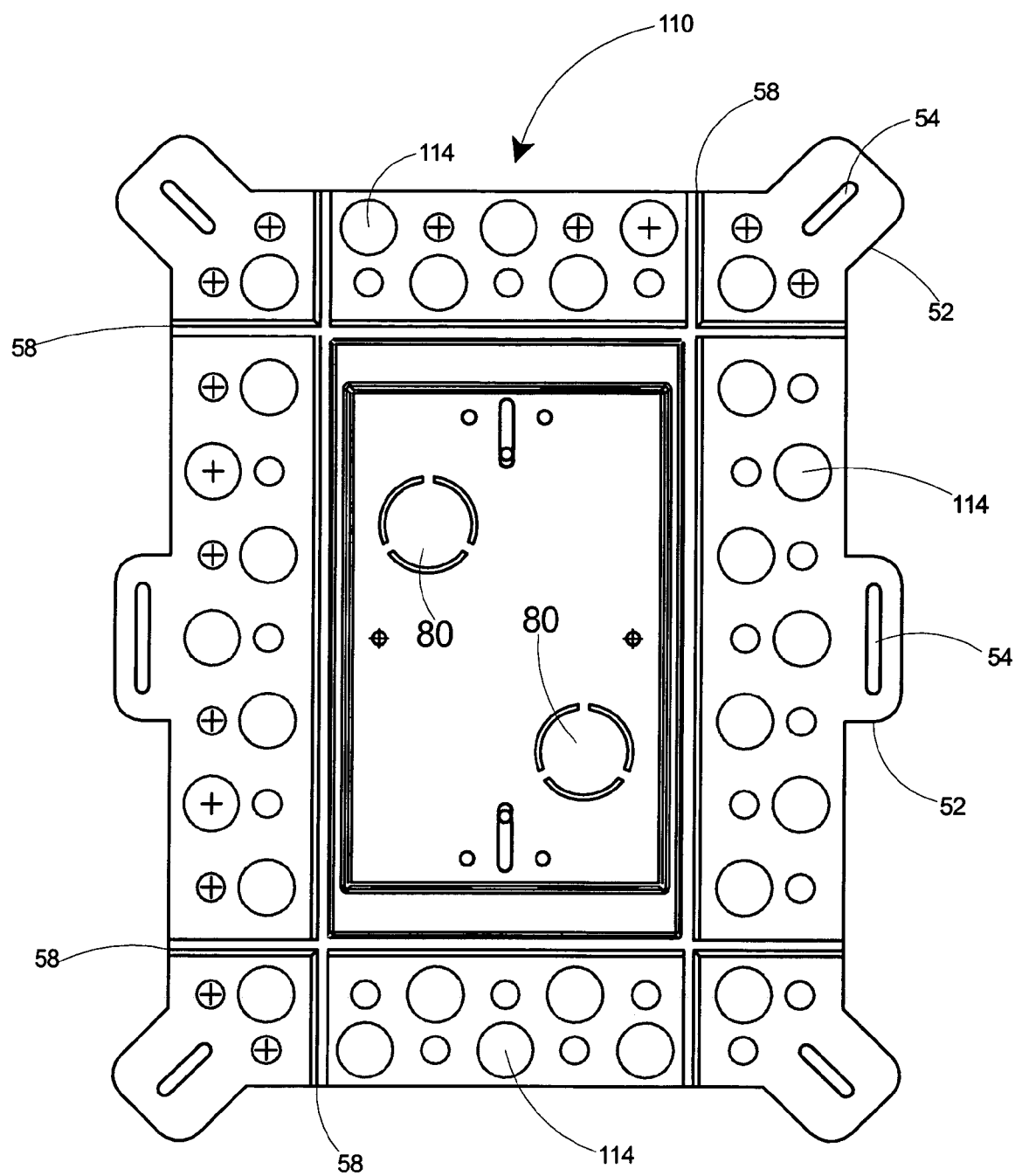
FIG. 10 is a back view of the electrical box of FIG. 8.
28)
Figure 14:
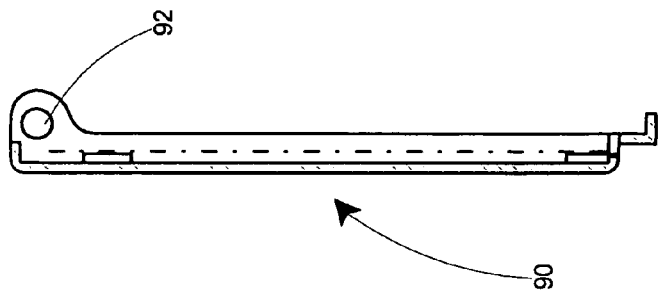
FIG. 14 is a bottom view of the cover member of FIG. 11.
32)
Figure 12:
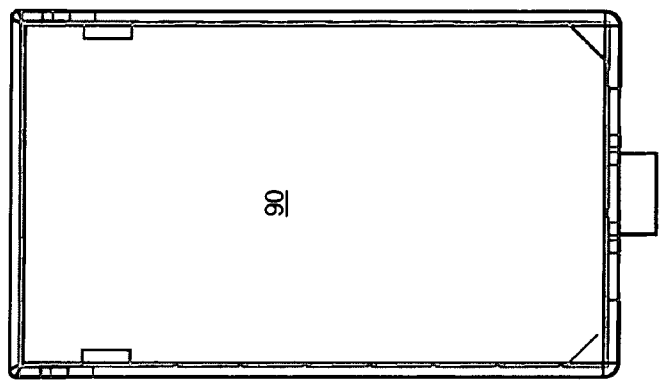
FIG. 12 is a front view of the cover member of FIG. 11.
30)
Figure 13:
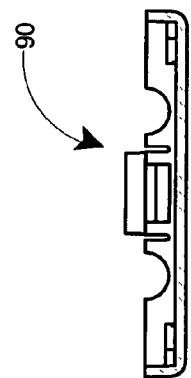
FIG. 13 is a side view of the cover member of FIG. 11.
31)
Figure 11:
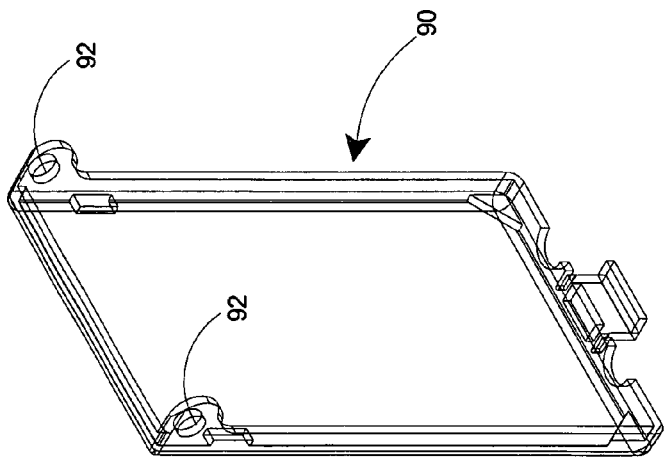
FIG. 11 is a perspective view of a cover member used with the electrical box of the present invention.
29)

50) Referring to FIGS. 8–10, there is shown a third embodiment 110 of a recessed electrical box according to the present invention. The third embodiment of the recessed electrical box 110 is for use on a new building that is to be finished with a stucco layer 112. Electrical box 110 includes a removable inner flange 46 but no outer flange. As shown in FIG. 9, on an unfinished building, the box 110 is simply pushed into an appropriately sized hole 102 that has been cut in the substrate 106. There is no need for an outer flange, as a stucco layer will later be applied over the inner flange 46.

51) All of the embodiments of the recessed electrical box as presented herein are preferably integrally formed in one piece. Therefore the first box 22, the second box 38, and the flange or flanges, including the inner flange 46 and the outer flange 48, are integrally molded in one piece. The recessed electrical box is preferably formed by injection molding of plastic. The plastic is preferably polycarbonate, polyvinyl chloride, polyethylene, or polypropylene.

52) The recessed electrical box of the present invention simplifies the installation of electrical devices on all types of finished exteriors, including siding or stucco. It is adaptable to being installed on an unfinished wall or as a retrofit on an existing finished wall. Operation of the recessed electrical box is accomplished by first determining whether it will be used in new construction, in which the building substrate is installed but not the siding or other finish layer, or it will be used on an existing building.

Figure 2B:
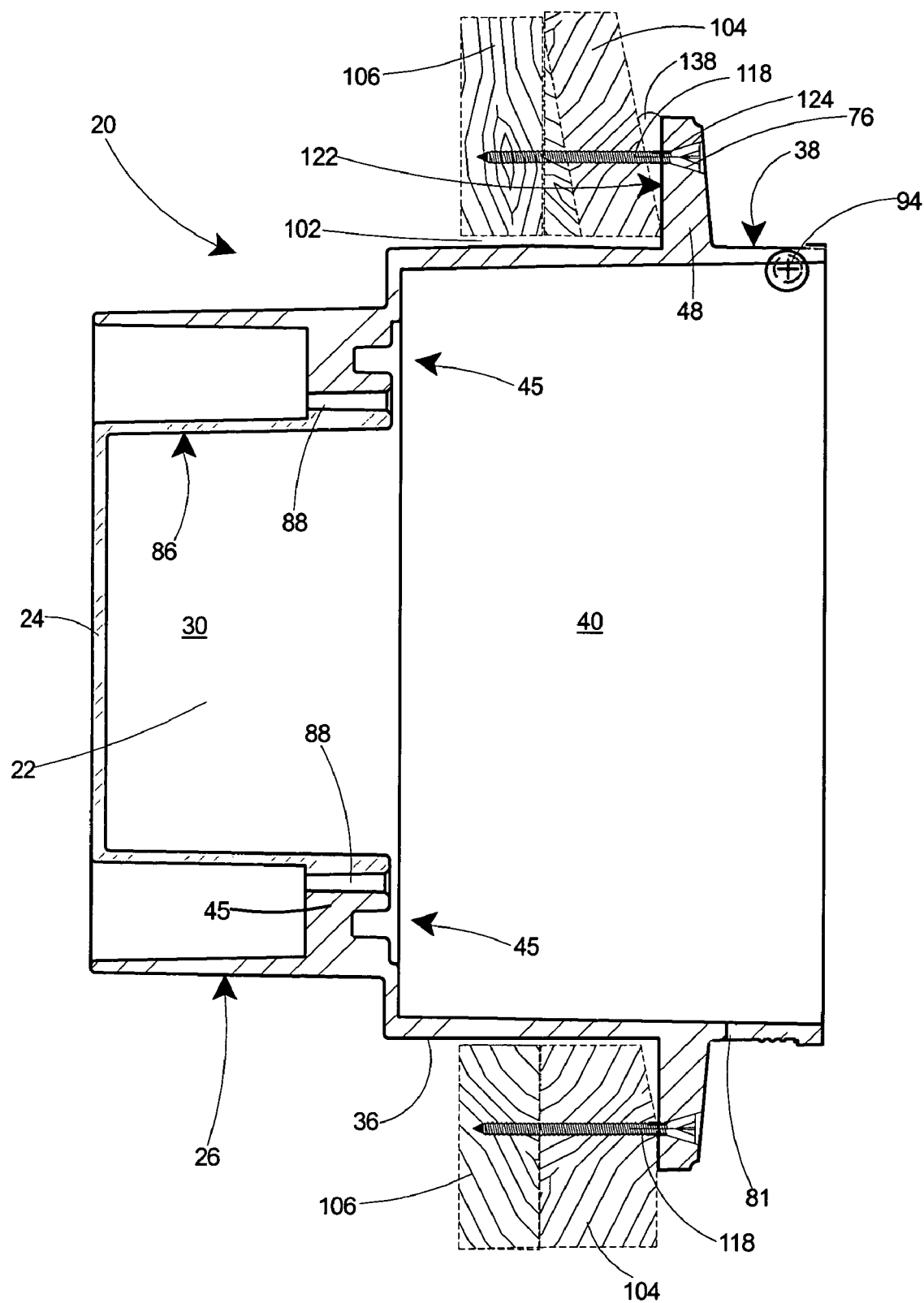
FIG. 2B is a sectional view of the recessed electrical box taken along line 2—2 of FIG. 1 and shown mounted to the siding of an existing building.

53) The reader is referred to FIG. 2A for an understanding of the installation procedure for the recessed electrical box on a newly constructed building and to FIG. 2B for an understanding of the installation procedure for the recessed electrical box on an existing building. If the building is under construction, with the substrate installed but no finished layer, the recessed electrical box is installed by first cutting an appropriately sized and shaped hole 102 in the substrate to accept the electrical box, as shown in FIG. 2A. The recessed electrical box 20 is then inserted into the hole 102 until the back surface 56 of the inner flange 46 is flush against the substrate 106. Fasteners 118 are then inserted through the slots 54 and tightened to secure the electrical box 20 to the substrate. Installing siding 104 on the substrate 106 then finishes the exterior of the building. The ends of the siding are placed flush with the second peripheral sidewalls 36 in the gap 96. Caulking is then applied at the juncture of the electrical box 20 with the siding 104 to seal against rain and the elements.

54) With reference to FIG. 2B, if the building is an existing building, with both the siding and substrate installed, this is termed a "retrofit" of an electrical box to an existing building. In this situation, the recessed electrical box 20 is installed by first cutting an appropriately sized and shaped hole 102 in both the substrate 106 and the siding 104 to accept the electrical box 20. If the building is an existing building, the inner flange 46 is removed by cutting along the grooves 58 (see FIG. 4) that are adjacent the outer periphery 68 of the second box 38. With the inner flange 46 removed, the electrical box 20 is inserted into the hole 102 until the back surface 122 of the outer flange 48 is flush against the siding 104. Holes 120 are then drilled in the outer flange 48 and fasteners 118 inserted therethrough. The fasteners 118 are then tightened into the siding 104 and the substrate 106 to secure the recessed electrical box 20 to the siding and the substrate. Caulking is then applied at the juncture of the electrical box 20 with the siding 104 to seal against rain and the elements.

Figure 6:
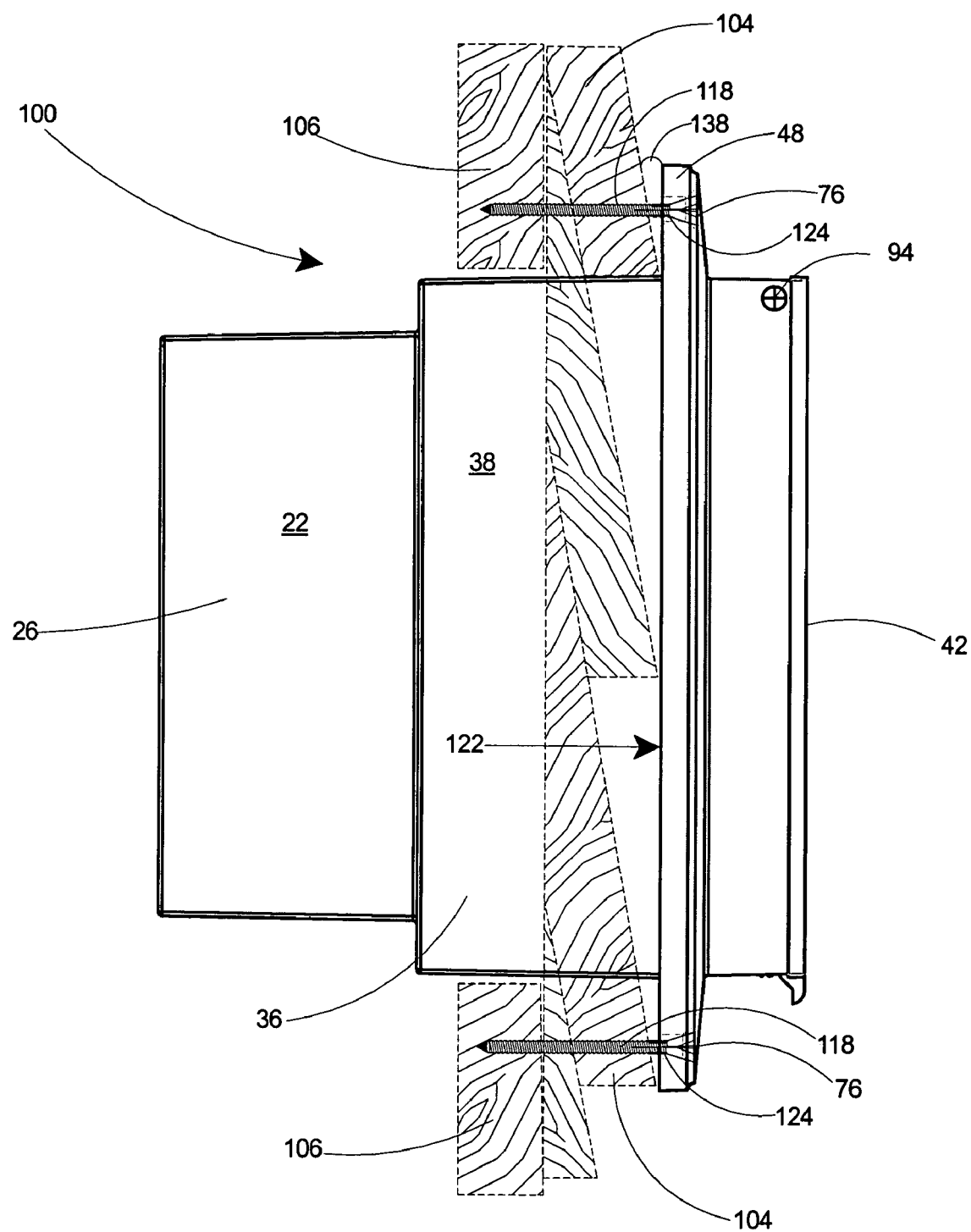
FIG. 6 is a side view of the recessed electrical box taken along line 6—6 of FIG. 5.
24)
Figure 7:
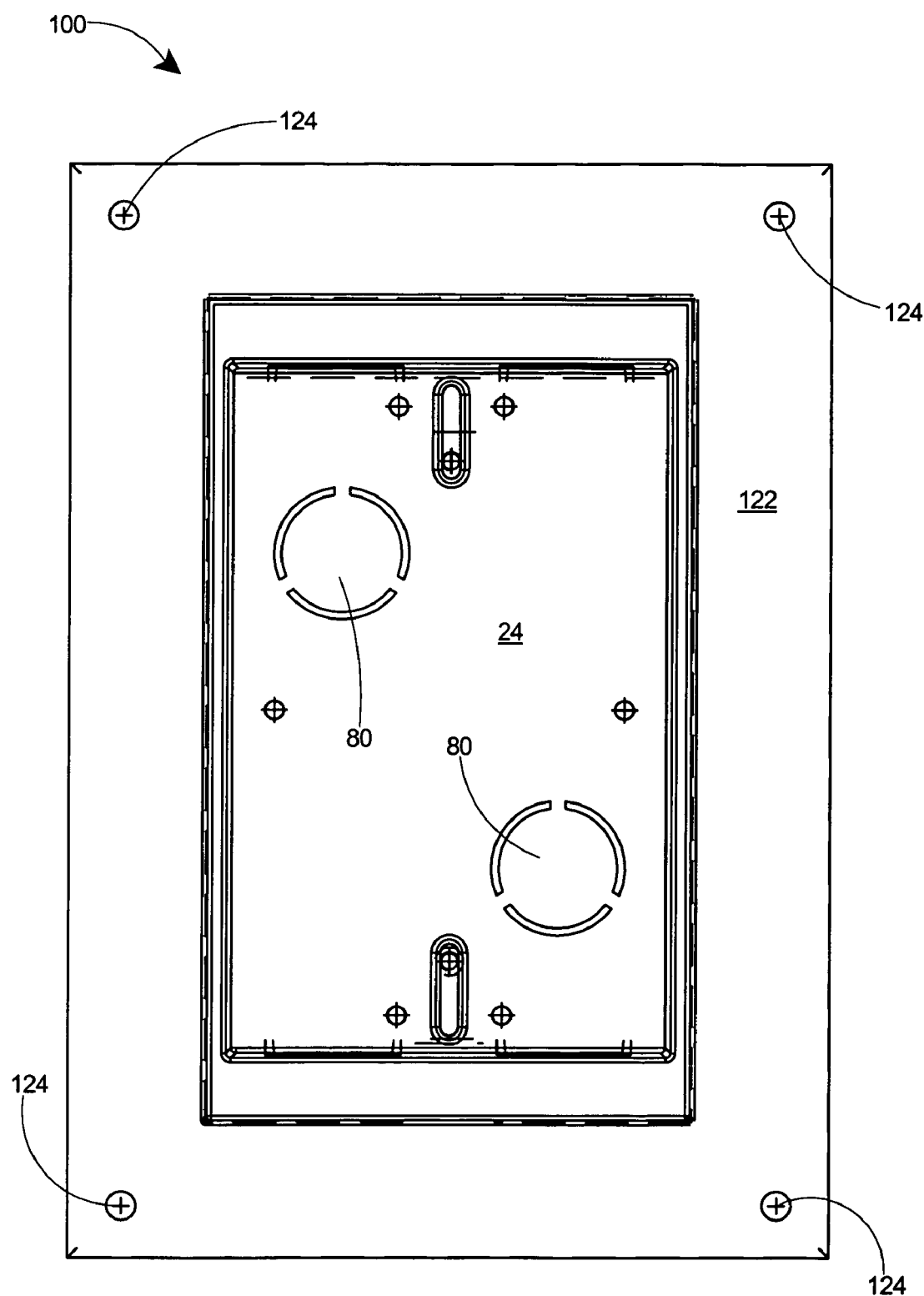
FIG. 7 is back view of the electrical box of FIG. 5.
25)

55) The second embodiment of the recessed electrical box 100, shown in FIG. 6, simplifies installation of an electrical box on an existing building. As shown in FIG. 6, both the substrate 106 and the siding 104 are installed. As the second embodiment 100 includes an outer flange 48 but no inner flange, the installer is saved the extra effort of having to remove an unneeded flange. To operate the second embodiment of the recessed electrical box 100, the installer cuts an appropriately sized and shaped hole 102 in the siding 104 and substrate 106. The recessed electrical box 100 is then inserted into the hole 102 until the back surface 122 of the outer flange 48 is flush against the siding 104. In the second embodiment of the recessed electrical box 100, holes 124 are included in the outer flange 48. The fasteners 118 are then are then inserted through the holes 124 and tightened into the siding 104 and the substrate 106 to secure the recessed electrical box 100 to the siding and the substrate. Caulking is then applied in the same manner as for the first embodiment.

56) As described above, the third embodiment of the recessed electrical box 110 is for use on a new building that will be finished with a stucco layer 112. With reference to FIG. 9, electrical box 110 includes a removable inner flange 46 but no outer flange. The third embodiment of the recessed electrical box can be used on the exterior wall of either a finished or unfinished building. To install the third embodiment 110 on an unfinished building, the box 110 is simply pushed into an appropriately sized hole 102 that has been cut in the substrate 106. Fasteners 118 are then placed through the slots 54 in the ears 52 of the inner flange 46 and tightened into the substrate 106. There is no need for an outer flange, as a stucco layer will later be applied over the inner flange 46 and no unsightly gap will exist between the stucco and the electrical box. The inner flange 46, as shown in FIG. 10, includes a plurality of holes 114 that allow stucco to flow through the inner flange 46 and thereby form a better adhesion to the inner flange 46 and to the substrate 106.

Figure 15:
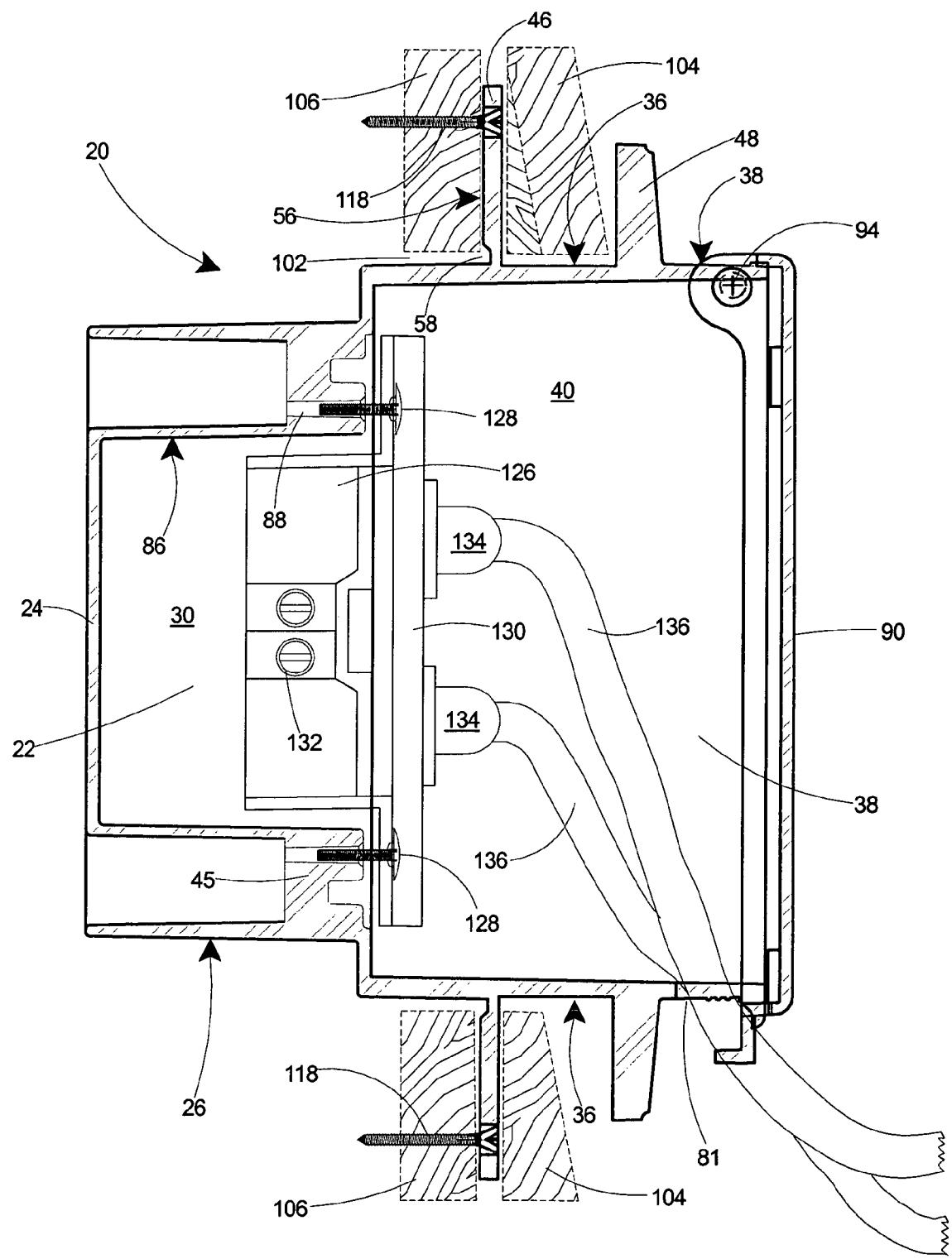
FIG. 15 is a sectional view of the recessed electrical box of FIG. 1 shown with a duplex receptacle installed therein and secured to an unfinished exterior wall.
33)

57) FIG. 15 depicts installation of the first embodiment of the recessed electrical box 20 on an unfinished wall or substrate 106. For installation on the unfinished wall, a hole is made in the substrate 106 and the recessed box 20 is inserted until the inner flange 46 contacts the substrate 106. To secure the electrical box 20 to the building, fasteners 118 are driven through the slots 54 provided in the inner flange 46 and into the substrate 106. The finish layer 104, consisting of lapped siding or any appropriate siding material, is installed within the gap 96 and placed snug against the second peripheral sidewalls 36. A duplex outlet 126 or other electrical device is then secured therein by device fasteners 128. A face plate 130 is fastened to the duplex outlet 126 to close the first box 22 and thereby seal the first enclosure 30 to protect the terminals 132 of the duplex outlet 126 and any wiring therein. The plug ends 134 of two electrical cords 136 are shown plugged into the duplex outlet 126 and run from the outlet 126 through the second enclosure 40 of the recessed electrical box 20 and through the cord slots 81 in the electrical box.

Figure 16:
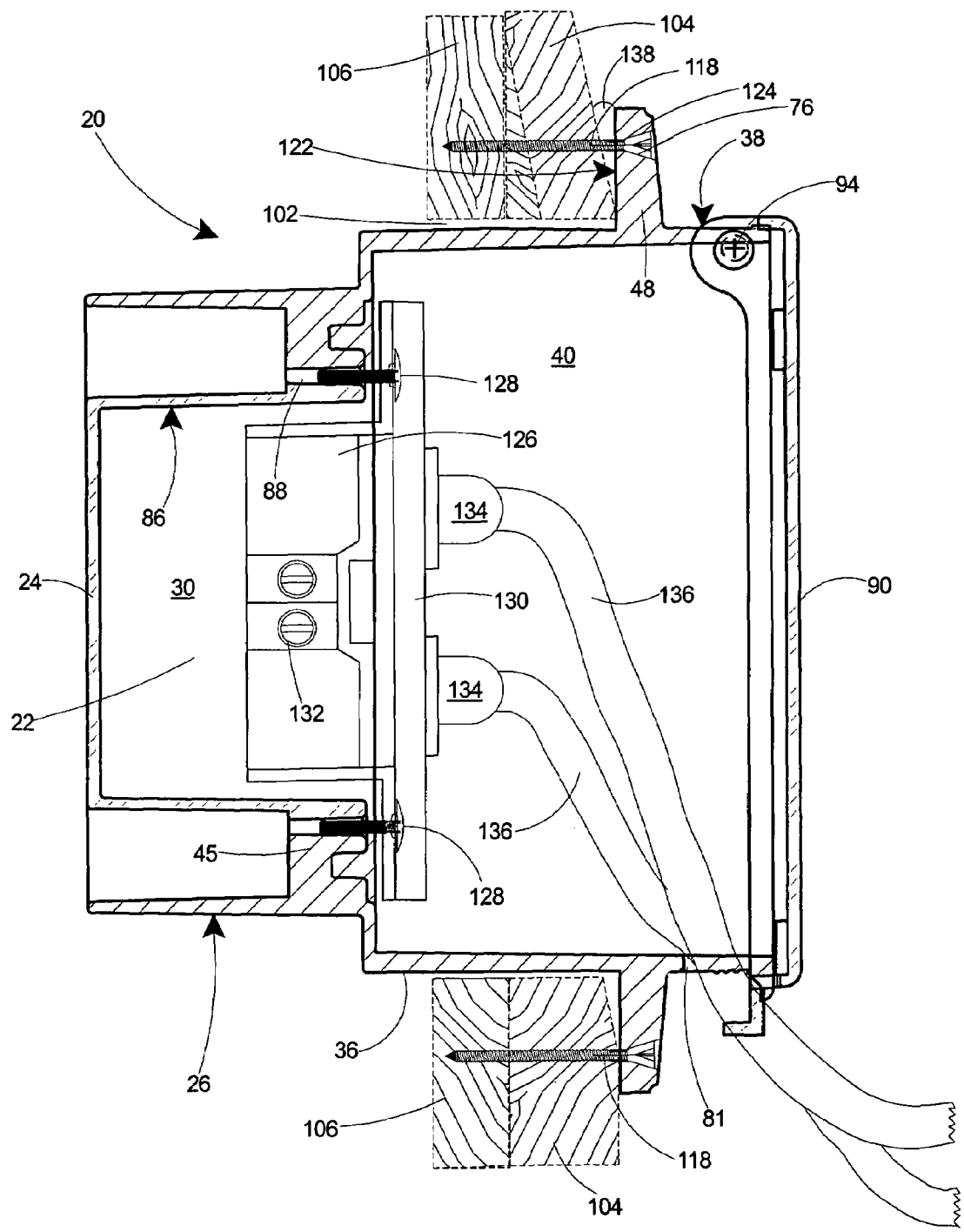
FIG. 16 is a sectional view of the recessed electrical box of FIG. 1 shown with a duplex receptacle installed therein and secured to a finished exterior wall.
34)

58) FIG. 16 depicts installation of the first embodiment of the recessed electrical box 20 on a finished wall or siding 104. For installation on a finished wall 104, the inner flange is removed and a hole 102 cut in the siding 104 or other finish layer to a size large enough to accommodate the outer periphery of the second peripheral sidewalls 36. The outer periphery of the outer flange 48 can be provided with indentations 76 to define drill bit guides. The electrical box 20, with the inner flange removed, is fitted into the hole 102 and pushed therein until the outer flange 48 is flush with the outer surface of the siding 104. Holes are drilled in the outer flange 48 and fasteners 118 inserted therein to secure the recessed electrical box 20 to the siding 104 and substrate 106 and thereby to the building.

Figure 17:
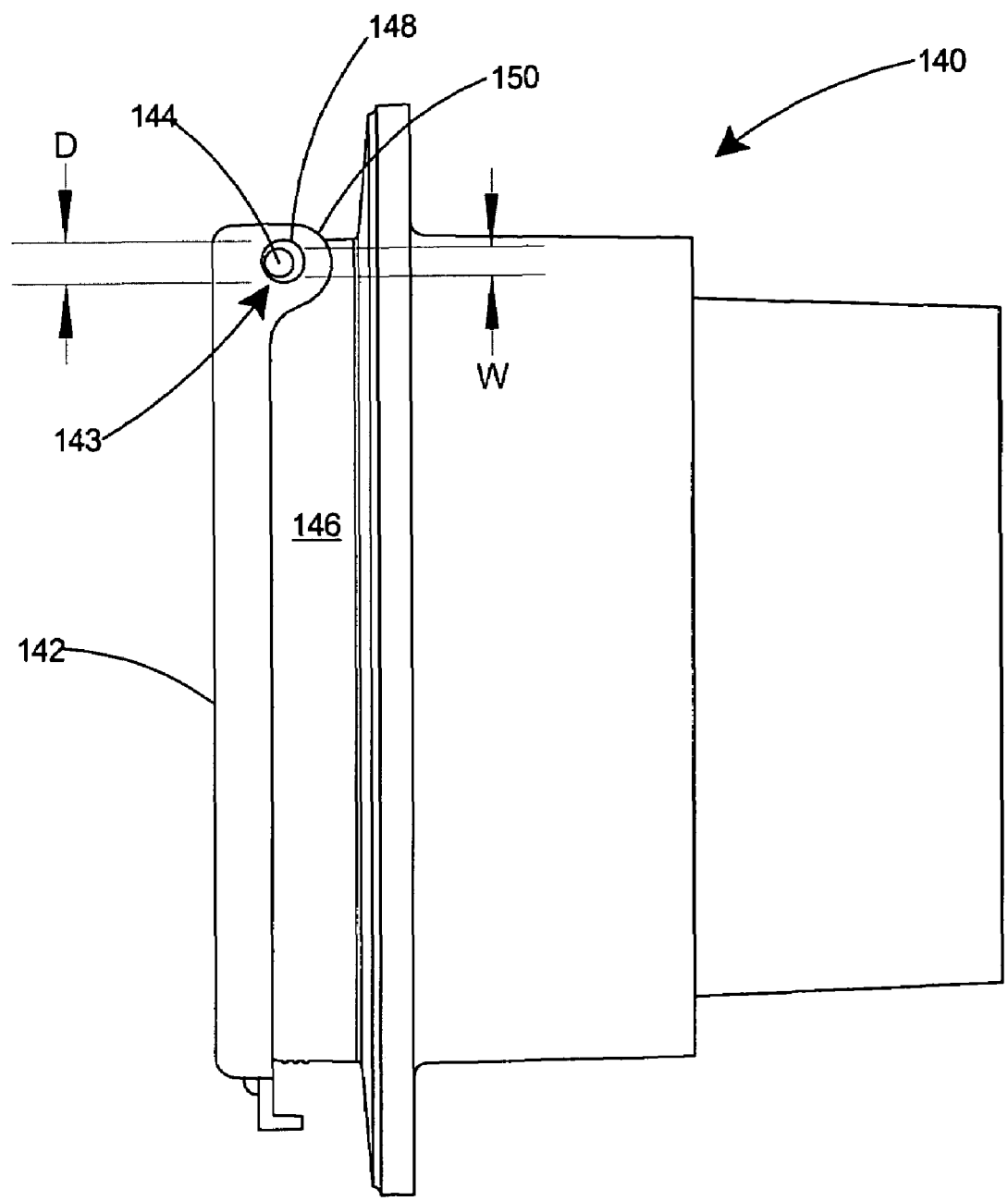
FIG. 17 is a side view of a fourth and preferred embodiment of a recessed electrical box having a breakaway cover member.
35)
Figure 18:
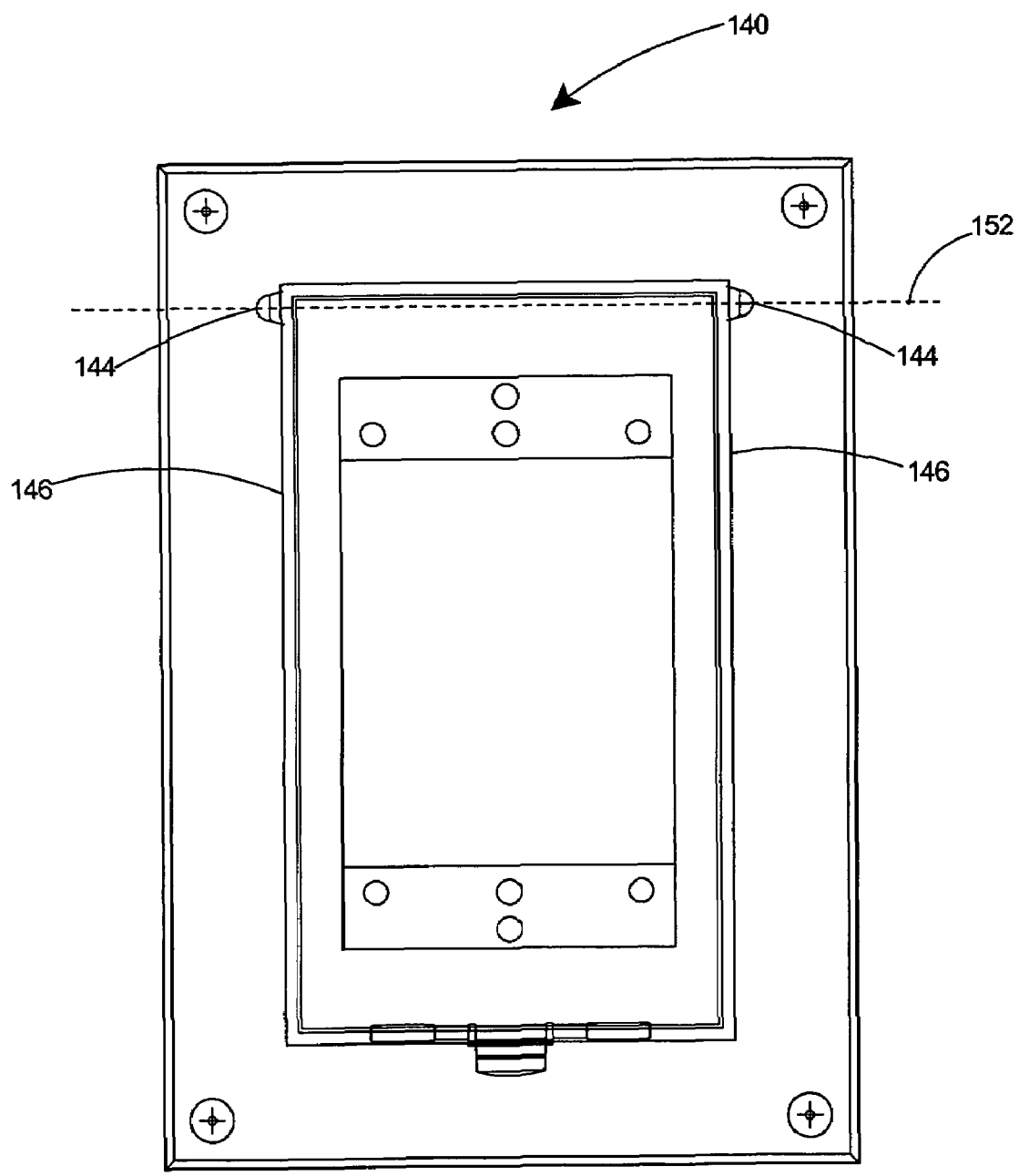
FIG. 18 is a front view of the recessed electrical box of FIG. 17.
36)

59) With reference to FIG. 17, there is shown a fourth and preferred embodiment of a recessed electrical box 140 having a breakaway cover member 142. The breakaway cover 142 includes a pin and socket arrangement 143 including an integral pin 144 preferably on the sidewall 146 of the recessed electrical box 140 and a socket or aperture 148 in the ears 150 of the cover member 142. The cover member 140 also includes a peripheral side wall 145.

Figure 22:
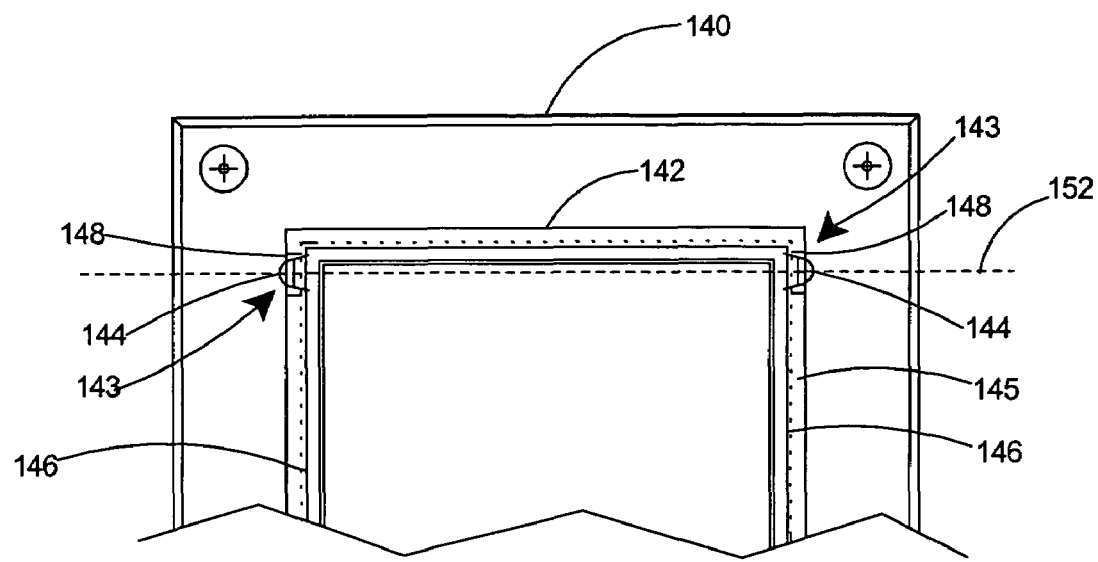
FIG. 22 is a view of the top portion of the recessed electrical box of FIG. 18 including the preferred embodiment of a pin and socket arrangement for attaching a cover member rotatable with respect to the electrical box.
40)

60) As shown in FIG. 22, the sidewall 146 of the electrical box 140 is located inside the peripheral side wall 145 of the breakaway cover member 142. In the preferred embodiment of a pin and socket arrangement 143 shown in FIG. 22, opposing pins 144 are integral with and located on each sidewall 146 of the electrical box 140 aligned axially along central axis 152. The opposing pins 144 extend through sockets 148 in the peripheral side wall 145 of the cover member 140.

Figure 23:
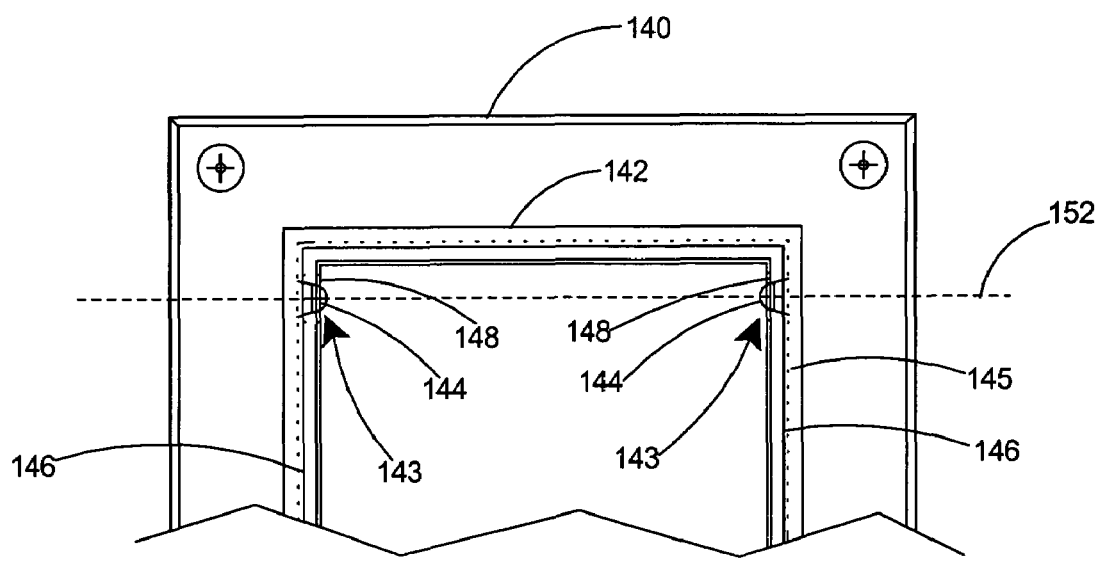
FIG. 23 is a view of a top portion of a recessed electrical box including an alternate embodiment of a pin and socket arrangement.

61) Alternatively, as shown in FIG. 23, the pin 144 can be integral with the peripheral side wall 145 of the cover member 142 and the socket 148 can be located in the sidewalls 146 of the recessed electrical box 140. Whether the socket 148 is formed in the cover member 142 (as shown in FIG. 22) or in the box member 140 (as shown in FIG. 23), the socket 148 is preferably a constant diameter aperture. In either embodiment, two pin and socket arrangements 143 are in line with one another on opposite sides of the side walls 146. Each of the pin and socket arrangements 143 include a pin 144 that is adapted to mate with a corresponding socket 148 for enabling the cover member 142 to be rotatably and firmly attached to the box member 140. Each socket 148 of the pin and socket arrangement 143 is adapted to receive its corresponding pin 144.

Figure 19:
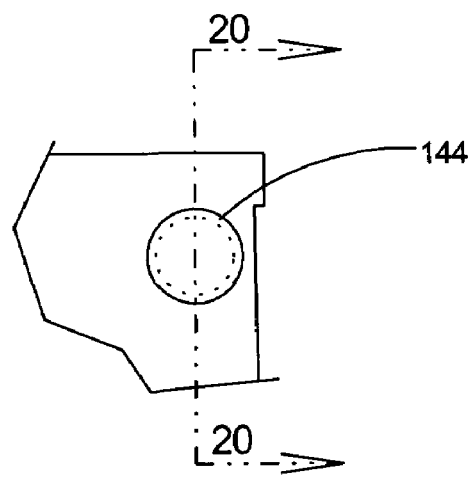
FIG. 19 is a detailed view of a pin and cover member portion of FIG. 17.
37)
Figure 20:
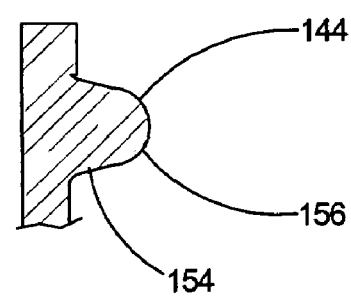
FIG. 20 is a sectional view taken along line 20—20 of FIG. 19.
38)
Figure 21:
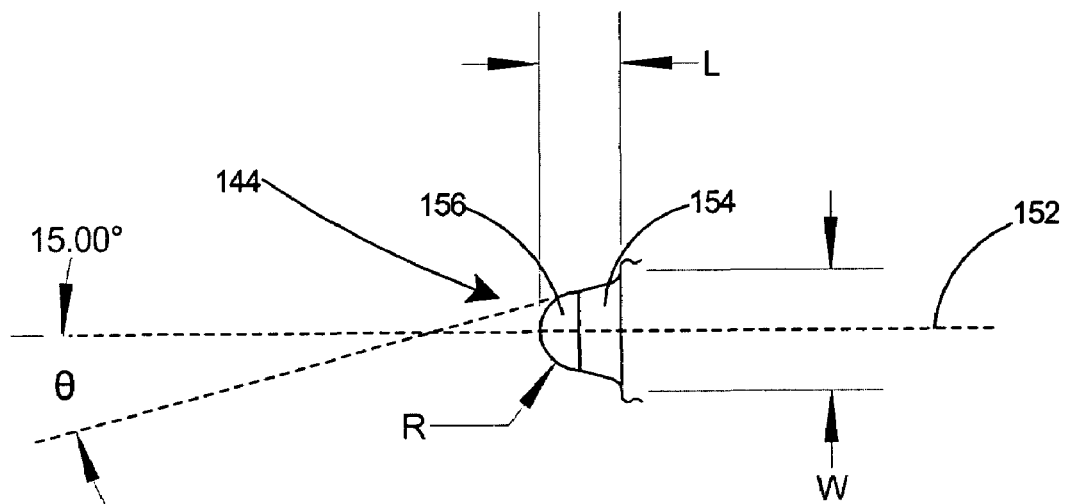
FIG. 21 is a detailed view of the pin portion of the electrical box shown in FIG. 18.
39)

62) Referring to FIGS. 19–21, the pins 144 include a base portion 154 and a tip portion 156. The base portion 154 has a conical surface that is preferably at an angle of between 10 and 25 degrees with respect to the longitudinal or central axis 152 of the pin. Most preferably, the conical surface is at an angle of 15 degrees, shown as angle $\theta$ in FIG. 21, with respect to the central axis 152 of the pin. The tip portion 156 is preferably rounded as shown by radius R in FIG. 21. The dimensions of the pin 144, including the width (W) and the length (L), is critical to enable the pin 144 to securely retain the cover member 142 (see FIG. 17) under normal use and also enable the cover member to be released when an excessive force is applied thereto. The tip portion 156 of the pin 144 includes a rounded surface to permit the socket 148 of the cover member 142 to be forced off of the pin 144 when an excessive force is applied thereto to the cover member 142. The angled conical surface of the base portion 154 and the rounded surface of the tip portion 156 insure that, upon an application of excessive force to the cover member 142, the socket 148 will be forced off of the pin 144 before destroying the pin and socket arrangement 143 or damaging the box member 140 or cover member 142.

63) Preferably, as shown in FIG. 17, the aperture 148 in the cover member 142 is of a larger diameter D than the diameter or width W of the pin 144. Preferably the length of the pin is between 0.15 and 0.23 inch and the width of the pin is between 0.2 and 0.3 inch. In an especially preferred embodiment, the diameter or width of the pin 144, represented by W in FIG. 21, is 0.242 inch, and the length L is 0.194 inch. The radius R of the rounded tip portion 156 is preferably between 0.08 and 0.10 inch. Most preferably, the radius R of the rounded tip portion 156 is 0.094 inch. The aperture 148 in the cover member 142 preferably has a diameter D of 0.280 inch.

64) As a result of the sloping conical surface (angle θ) of the base portion 154 of the pin 144, the radius R of the tip portion 156, the overall length L and width W of the pin 144, and the diameter of the apertures 148 in the breakaway cover member 142, any excessive force applied to the cover member 142 when it is in its open position will cause the cover member 142 at the apertures 148 to ride up the slope θ of the pin 144 and from thence to ride over the radius R of the tip portion 156 at which point the cover member 142 will pop off the pins 144. This arrangement, with an excessive force applied to the cover member in the open position, will provide a breakaway cover member 140 that will slip off the pins 144 on the sidewalls 146 of the electrical box 140 thereby protecting the integrity of both the cover member 140 and the pins 144.

65) Having thus described the invention with reference to a preferred embodiment, it is to be understood that the invention is not so limited by the description herein but is defined as follows by the appended claims.

What is claimed is:

1. An electrical box comprising:
    a box member having an open front, side walls, and a back wall defining an enclosure therein;
    integral pins extending from said side walls;
    a cover member rotatably attached to said pins;
    said cover member including apertures therein;
    said pin including a longitudinal axis, a base portion, and a tip portion;
    said base portion of said pin including a non-cylindrical surface having an angle with respect to said longitudinal axis;
    said tip portion of said pin having a rounded surface;
    a front edge at said open front of said side walls;
    at least one flange integral with and extending outwardly and orthogonally from said side walls; and
    a securement arrangement within said box member capable of accepting an electrical device, said securement arrangement a substantial distance behind said front edge.

2. The electrical box of claim 1 wherein
    said flange includes a back surface; and
    said back surface of said flange includes grooves adjacent said side walls; whereby said grooves form reduced thickness flange portions to allow scoring therein to remove said flange adjacent said side walls.

3. The electrical box of claim 1 wherein said flange extends substantially beyond said side walls of said box member.

4. The electrical box of claim 1 wherein said securement arrangement includes
    integral projections from said side walls extending transversely into said enclosure;
    threaded bores in said integral projections; and
    fasteners for cooperating with said threaded bores.

5. The electrical box of claim 1 including
    a first box including a back wall, orthogonally extending peripheral sidewalls, and an open front defining a first enclosure therein;
    said peripheral sidewalls of said first box having a front edge at said open front;
    a transverse wall portion extending outwardly and orthogonally from said peripheral sidewalls of said first box at said front edge;
    second peripheral sidewalls extending orthogonally from said transverse wall portion and forming a second box and a second enclosure therein;
    at least one flange integral with and extending outwardly and orthogonally from said second peripheral sidewalls;
    said second peripheral sidewalls terminating in a planar front edge;
    said planar front edge having an opening therein to said second enclosure; and
    a securement arrangement at said open front of said first enclosure for accepting an electrical device.

6. An electrical box with a firmly attached rotatable cover comprising:
    a box member having an open front, a top, a bottom and two side walls defining an enclosure therein;
    a cover member rotatably and firmly attached to said box member;
    two pin and socket arrangements in line with one another on opposite sides of said two side walls;
    each of said pin and socket arrangements including a pin adapted to mate with a corresponding socket for enabling said cover member to be rotatably and firmly attached to said box member;
    said pin of said pin and socket arrangement having a longitudinal axis, a base portion, and a tip portion;
    said socket of said pin and socket arrangement adapted to receive said pin;
    said base portion of said pin including a conical surface having an angle with respect to said longitudinal axis; and
    said tip portion of said pin having a rounded surface that permits said socket to be forced off of said pin when an excessive force is applied thereto to said cover member before destroying said pin and socket arrangement.

7. The electrical box of claim 6 wherein said socket is an aperture in said cover member that is a constant diameter.

8. The electrical box of claim 6 wherein
    said pins extend from said side walls of said box member; and
    said sockets are in said cover member.

9. The electrical box of claim 6 wherein
    said pins extend from said cover member; and
    said sockets are in said side walls of said box member.

* * * * *